(12) United States Patent
Kuhn

(10) Patent No.: US 6,443,412 B1
(45) Date of Patent: Sep. 3, 2002

(54) DEVICE FOR FASTENING A SUSPENSION DEVICE TO A SUPPORT, ESPECIALLY TO A CEILING

(75) Inventor: Peter Kuhn, München (DE)

(73) Assignee: Mavig GmbH, Munich (DE)

( * ) Notice: Subject to any disclaimer, the term of this patent is extended or adjusted under 35 U.S.C. 154(b) by 0 days.

(21) Appl. No.: 09/807,017
(22) PCT Filed: Oct. 11, 1999
(86) PCT No.: PCT/EP99/07603
§ 371 (c)(1), (2), (4) Date: Apr. 5, 2001
(87) PCT Pub. No.: WO00/22342
PCT Pub. Date: Apr. 20, 2000

(30) Foreign Application Priority Data

Oct. 9, 1998 (DE) .................................. 298 18 108

(51) Int. Cl.[7] .............................................. B42F 13/00
(52) U.S. Cl. .................................................... 248/343
(58) Field of Search ........................ 248/343, 342, 248/317, 333, 917

(56) References Cited

U.S. PATENT DOCUMENTS

| | | |
|---|---|---|
| 4,964,606 A | 10/1990 | Beam et al. ................ 248/333 |
| 5,405,117 A | 4/1995 | Davis |
| 5,984,640 A * | 11/1999 | Wang .......................... 248/343 |
| 6,116,559 A * | 9/2000 | Lackey ........................ 248/343 |
| 6,311,943 B1 * | 11/2001 | Tang ........................... 248/343 |

OTHER PUBLICATIONS

W.M. Winslow, "Induced Fibration of Suspensions", Journal of Applied Physics, vol. 20, Dec. 1949, pp. 1137–1140.

* cited by examiner

Primary Examiner—Ramon O. Ramirez
(74) Attorney, Agent, or Firm—Scully, Scott, Murphy & Presser

(57) ABSTRACT

The invention relates to a device for fastening a suspension device (15) to a support (13), especially to a ceiling (5). The device comprises a flange (1) which can be mounted on the support (13), a support tube (3) connected with a first end to said flange (1), and has an arm (4) which is connected to the second end of the support tube (3) opposite the first end and which is provided on a swivel bearing (5). The inventive device also comprises an anchoring element (7) which, in addition to the flange (1) and independent of said flange (1), can be mounted on the support (13), and comprises a securing element (6). The securing element extends from the anchoring element (7) up to the arm (4) through the support tube (3), is fastened to the arm (4) at a fastening point (20), and is connected to the anchoring element (7).

10 Claims, 2 Drawing Sheets

DEVICE FOR FASTENING A SUSPENSION DEVICE TO A SUPPORT, ESPECIALLY TO A CEILING

The invention relates to a device for fastening a suspension arrangement to a carrier, in particular the ceiling of a room.

Suspension arrangements of the existing type serve to hold utility articles in readiness in suspended positions of use in the region of workstations. Preferred uses for an existing suspension arrangement are medical treatment stations in doctors' surgeries and clinics and also medical technology workstations in medical laboratories. Examples of utility articles which may be supplied with a suspension arrangement are, for example, X-ray shields, measuring appliances, image-reproducing appliances (monitors), components for depositing working or treatment instruments, and the like.

A known device for fastening a suspension arrangement to a carrier comprises fastening means, in particular screws, with which a flange at the upper end of a suspension arrangement can be fastened, for example by means of screws, to a carrier constituting, for example, the ceiling of a room.

Under normal conditions of use, an existing suspension arrangement is mainly stressed exclusively in respect of traction and is loaded only to a far lesser extent as regards forces directed transversely to the direction of traction which are brought about by the weight of the utility articles which, in most cases, are disposed on carrying arms which extend approximately horizontally and are connected by pivot bearings to a bracket on the lower end of a support tube. Since these torque forces acting on the flange are relatively small, the flange and a support tube extending downwards from the latter are manufactured with relatively small dimensions in horizontal cross-section.

A device of the existing kind for fastening a suspension arrangement can, however, be relatively easily overloaded. This is particularly the case if the said suspension arrangement is additionally loaded with horizontal forces. One conceivable instance of loading with the danger of unintentional severing of the fastening system between the flange and the carrier may happen, for example, if a transport truck is driven into the suspension arrangement. In the event of such an overload, there is a danger of the flange-fastening system becoming detached or being torn out of the carrier, and of the suspension arrangement falling down, which may result not only in major damage to the utility articles but also in major harm to persons.

The underlying object of the invention is to improve fastening safety in a device of the existing type.

This object is achieved by means of the features in claim 1.

In the device according to the invention, an anchoring element is provided which can be attached to the carrier in addition to, and independently of, the flange. Also provided is an elongated securing element which is connected to the anchoring element, extends through the support tube as far as the bracket, and is connected to the latter.

The additional securing element is of such great tensile strength that, in the event of damage to, or the falling-out of, the fastening elements operating between the flange and the carrier, the said securing element is capable of holding the suspension arrangement on the carrier. As a result of this, the suspension arrangement is held, even in the event of falling-out of the elements fastening the flange to the carrier, and is prevented from falling down if the first fastening elements operating between the flange and the carrier are unintentionally severed, for example in the event of a driving accident as initially described.

The securing element according to the invention is of sufficiently long dimensions for it to extend as far as the region of the first end of the support tube. In this region, the additional anchoring element can be connected to the carrier, as a result of which the securing element becomes functional.

According to claim 2, the securing element may be of even longer dimensions, so that it projects above the flange and can be mounted on a part of the carrier, or a part attached to the latter, which is disposed higher than the said carrier. If, for example, the carrier is suspended from an intermediate ceiling, the securing element of longer dimensions can extend as far as the main ceiling and be anchored there. This results in another safety aspect, since the securing element is securely suspended even if, in the event of unintentional overloading, not only the first fastening elements operating between the flange and the intermediate ceiling, but also the said intermediate ceiling, should be damaged and their carrying function impaired.

But even if the flange and the securing element are fastened to one and the same carrier, it is advantageous for the securing element to be of longer dimensions so that it is not under tensile stress in the normal fastening position but, because of its greater length, is in a position of readiness, for which purpose a flexible securing element, the effective length of which can be reduced and which is capable of kinking or sagging because of its greater length, is particularly suitable. In a configuration of this kind, in the event of an overload and of detachment of the suspension arrangement, the securing element commences its suspending function only after the said suspension arrangement has dropped. This is advantageous because, in the overloading process in which the suspension arrangement performs a detaching movement, for example a tilting movement, the securing element initially remains devoid of load, so that the loading process cannot also overload the said securing element. Only when the suspension arrangement detaches itself from the anchorage between the flange and the carrier because of overloading, and moves in the process, does the securing element commence its carrying function. An overload in the form of a brief impact thus cannot overload the securing element.

Features which further improve the safety sought after, lead to simple and secure fastening measures, permit a simple and cost-effectively manufactured configuration and also guarantee easy and rapid mounting, are contained in the subclaims.

The invention, and other advantages which can be achieved by means of the latter, will be described in greater detail below with the aid of a preferred exemplified embodiment and drawings. In the latter:

Figure 1:
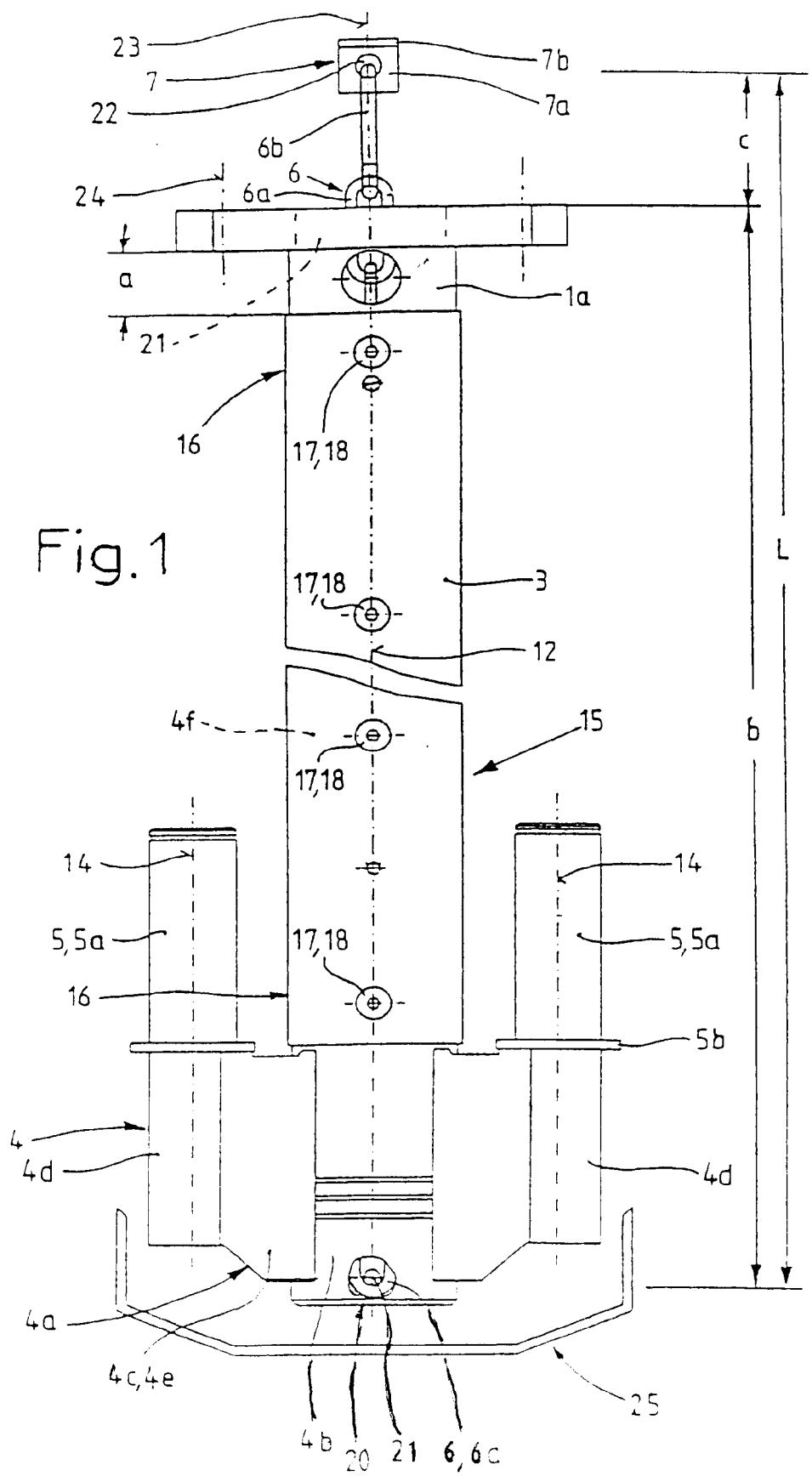
FIG. 1 shows a device according to the invention for fastening a suspension arrangement to a carrier.
Figure 3:
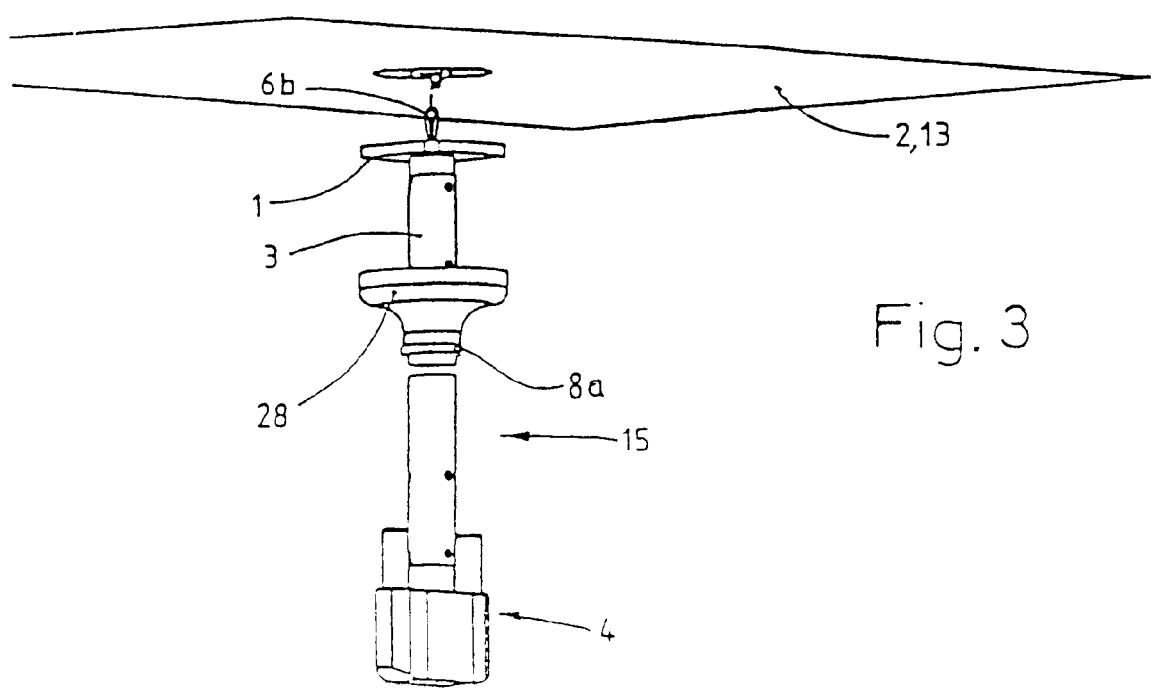
FIG. 3 shows the suspension arrangement in an intermediate mounting position at the ceiling of a room.

The main parts of the suspension arrangement are: a flange 1 for fastening the said suspension arrangement to a carrier which is not represented in FIG. 1, for example to the ceiling 2 of a room, which ceiling is represented in FIG. 3; a support tube 3 which, in the present exemplified embodiment, extends vertically and is connected, at its upper, first end, to the flange 1 and, at its lower, second end, to a bracket 4 which preferably extends transversely and has at least one pivot bearing 5; an elongated securing element 6 for the suspension arrangement, which securing element extends longitudinally through the support tube 3; and an additional element 7 for anchoring the suspension arrangement to the upper, first end of the securing element 6.

In the present configuration, the bracket 4 has two pivot bearings 5 which are disposed so as to be offset laterally with respect to the vertical central axis 12 of the support tube 3, and are preferably disposed on mutually opposed sides of the bracket 4.

The suspension arrangement serves to suspend on the carrier 13 constituted here by the ceiling, and to hold ready for use, utility articles, not represented, at a preferably medical treatment station and workstation. The said utility articles may be mounted directly, or by means of carrying arms which are not represented, on the pivot bearings 5 of the bracket 4. Mounting on the pivot bearings 5 makes it possible to pivot the carrying arms, and/or the utility articles, about the central axes 14, which preferably extend vertically, of the pivot bearings 5, and into various working positions, as a result of which favourable positions with respect to the treatment station or working station can be achieved—for example, in the case of a monitor constituting a utility article, a favourable position with respect to the line of vision of a person present at the treatment station. Other examples of utility articles which can be held ready by means of the suspension arrangement 1 are a shield, for example a transparent shield, against X-ray radiation, a table for depositing instruments, and the like.

In the present configuration, the pivot bearing or bearings 5 is/are constituted, in each case, by a bearing journal 5a which extends upwards from the bracket 4 and is located, as part of the said bracket 4, beside, and at a lateral distance from, the support tube 3. Furthermore, each bracket 4 has a bracket base 4a from which the bearing journals 5a extend upwards. In the present configuration, the bracket base 4a is of multi-part construction, continuing through a bracket tube 4b which is disposed coaxially with the vertical central axis 12 and which is connected, by lateral webs 4c in each case, to a lower longitudinal section 4d of the appertaining bearing journal 5a. For the purpose of increasing stability, each web 4c may be formed by two metal web plates 4e which are located at a distance from one another and are connected to the bracket tube 4b and the appertaining longitudinal section 4d in a tangential and/or secantial disposition with respect to the said bracket tube and longitudinal section. In the present configuration, in which the essential parts of the suspension arrangement 15 so far described consist of steel, the metal web plates 4e are welded to the bracket tube 4b and the longitudinal sections 4d. A journal collar 5b, against the underside of which the appertaining web 4c abuts for stabilising purposes, is preferably provided between the bearing journal 5a and the longitudinal section 4a in each case.

For the purpose of connecting it to the support tube 3, the bracket 4 has a tubular connecting piece 4f which projects upwards from the said bracket and is formed by an upwardly protruding prolongation of the bracket tube 4b and which is connected to the support tube 3 by a plug-in connection 16 and secured in the said connection by one or more locking elements 17. In the present configuration, the tubular connecting piece 4f and the appertaining lower end section of the support tube 3 are plugged together in the form of sleeves, the support tube 3 engaging over the tubular connecting piece 4f with slight clearance of motion at this point.

one or more locking elements 17, which are at an axial distance from one another, may be constituted by transverse bolts in the form of pins or screws 18 which pass through the walls of the tubular connecting piece 4f and of the support tube 3 in mutually appertaining holes in each case on one side or both sides and, in doing so, may extend right through transversely.

The connection between the support tube 3 at its upper, first end and the flange 1 may be constructed, in a mirror-inverted disposition, in a manner corresponding to the plug-in connection 16 with a locking element 17 constituted, for example, by screws 18, as is clearly shown, in particular, in FIG. 1. In the case of this connection, the existing tubular connecting piece 1a is fastened, for example welded, to the flange 1, under which circumstances it projects downwards from the said flange 1.

One difference between the lower and upper plug connections 16 may consist in the fact that the lower, second end of the support tube 3 extends directly as far as the bracket base 4a, whereas the upper end of the said support tube 3 may be at a vertical distance a from the flange 1, it being possible to dispose in the upper tubular connecting piece 1a, in the region of the said distance a, a transverse hole 19 which may serve, for example, for the slipping-in of an auxiliary mounting pin for the temporary positioning of the securing element 6.

The said securing element 6 is an elongated structural part whose length is preferably reducible, it being possible for the said element to consist of e.g. a strap, a cable or a chain, which are pliable and reducible in their length because of their natural flexibility. The securing element 6 extends longitudinally and preferably coaxially within the support tube 3 and the tubular connecting pieces 1a, 4f, the said securing element reaching through the flange 1 within a hole 21 and being capable of being contracted in its length because of the lateral clearance of motion that exists. In the present configuration, the securing element 6 consists of a chain whose links are designated by 6a. The uppermost chain link can be opened selectively and, in the present configuration, is constituted by an ordinary snap hook 6b. The lower end of the securing element 6 is connected to the bracket 4, in this case to its bracket base 4a, under which circumstances it is connected to the bracket tube 4b, preferably in the lower end region thereof, for example by means of a transverse bolt 21 which is anchored in the said bracket tube 4b, for example by welding or through the fact that the said transverse bolt 21 is seated in transverse holes in the wall of the bracket tube. The fastening point 2 thus formed is designated by 20. Part of the securing element 6 may also constitute the anchoring element 7, although the latter may also be part of the carrier 13. FIG. 1 shows, as the anchoring element 7, an angular or T-shaped structural part with a hole 22 in the downwardly pointing leg 7a, in which the snap hook 6b is seated. One or two mutually opposed webs 7b on the anchoring element 7 can be screwed or pinned to the carrier 13 by means of fastening elements 23, for example screws 23a, which reach through holes in the webs 7b and are represented in only a token manner.

The extended and effective length L of the securing element 6 is of larger dimensions than the vertical distance b between the fastening point 20 and the abutment side or upper side of the flange 1, so that the securing element 6 projects above the flange 1 by the amount c. This is advantageous for a number of reasons, as will be explained later on.

The device for fastening the suspension arrangement 15 to the carrier 13 thus comprises not only the flange 1 and appertaining fastening elements 24, for example fastening screws, which are represented in only a token manner and which reach through the flange 1 within holes, and enframe it in the carrier 13, but the device also comprises the securing element 6 and its fastening systems on the underside and top side, in this case the anchoring element 7 and any appertaining fastening elements 23 which may be present.

The effective length L of the securing element 6 is preferably of such dimensions that, when the suspension arrangement 15 is suspended from the carrier 13 solely with the aid of the securing element 6, there is a vertical distance c between the said carrier 13 and the flange 1. A first advantage of this configuration can be seen in the fact that it is possible, during the attachment of the suspension arrangement 15 to the carrier 13, for the said suspension arrangement 15 to be initially attached centrally with the aid of the securing element 6, for example by the hooking of the snap hook 6b into the anchoring element 7 which has been fastened previously. After that, the flange 1 can be fastened to the carrier 13 with the aid of the appertaining fastening elements 24 in an easy-to-handle manner, and be lifted by a resulting amount in the process.

Another important advantage of the excess length of the securing element 6 consists in the fact that, in the final fastening position of the device or of the suspension arrangement 15, the said securing element is exempted from loadings which endeavour to detach the said suspension arrangement 15 from its fastening system on the carrier 13. If, for example, the suspension arrangement 15 is overloaded transversely, which can happen, for example, if it is driven into by a truck, there is a danger of the fastening elements 24 being torn out of their anchorage on the carrier 13, as a result of which the said suspension arrangement 15 would fall down and the initially described damage to things and persons might occur. In the event of such overloading, the securing element 6 with the appertaining fastening elements proves to be an additional securing arrangement which catches the suspension arrangement 15 and prevents it from falling down. If the securing element 6 has an excess length, it is additionally exempted from overloading, even in the event of a tilting movement of the support tube 3. If an excess length is absent, the presence of the additional securing element 6 leads to stabilising of the fastening system.

Figure 2:
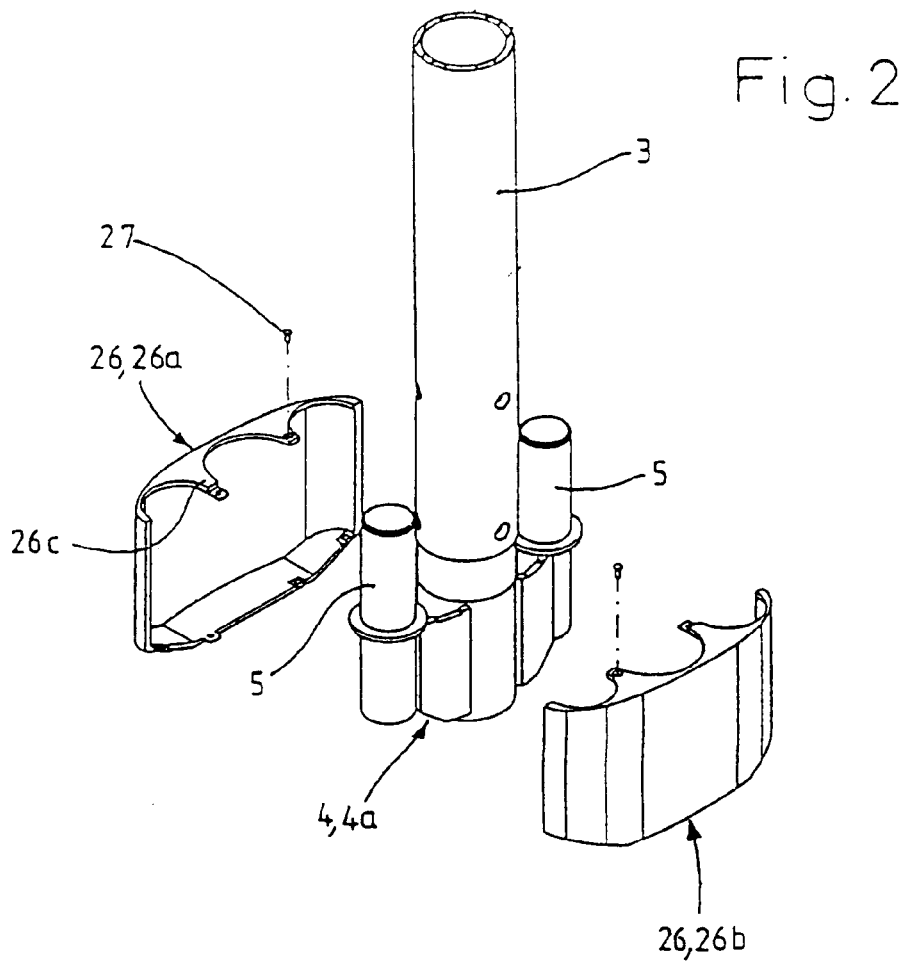
FIG. 2 shows the lower region of the suspension arrangement, in a perspective representation and with additional covering parts.

Additional covering parts for covering the bracket body 4a are represented in FIGS. 1 and 2. FIG. 1 shows a covering cap 25 which can be slipped onto the bracket body 4a from below and fixed, for example by a gripping action or by at least one screw, which is not represented.

FIG. 2 shows a covering casing 26 in the form of two casing half-shells 26a, 26b which can be connected to one another by retaining elements, for example by means of screws 27 which can be screwed into wall parts which engage over one another. In the present configuration, the dividing joint between the half-shells 26a, 26b is upright, the latter having transverse tongues 26c which engage over the bracket body 4a between the bearing journals 5a and the tubular connecting piece 4f.

Also represented in FIG. 3 is a covering part 28 which is vertically displaceable on the support tube 3 in the form of a rose or an annular cover plate, and can be retained on the said support tube 3 in its upper covering position by a retaining element 8a.

FIG. 3 shows the suspension arrangement 15 in an intermediate mounting position, in which, however, the snap hook 6b has been rotated by 180° with respect to its previous position, so that its larger arc points upwards. This twisting operation preferably takes place after the hooking-in of the snap hook.

What is claimed is:

1. Device for fastening a suspension arrangement (15) to a carrier (13), in particular the ceiling (2) of a room, the said device having: a flange (1) which can be attached to the carrier (13); a support tube (3) which is connected at one, first end, to the flange (1); a bracket (4) which is connected to the second end, which is located oppositely to the first end, of the support tube (3), and on which bracket there is provided at lease one pivot bearing (5); and anchoring element (7) which is attachable to the carrier (13) in addition to the flange (1) and independently of the latter; and an elongated securing element (6) which extends through the support tube (3) from the anchoring element (7) as far as the bracket (4) and which is fastened to the said bracket (4) at a fastening point (20) and is connected to the said anchoring element (7).

2. Device according to claim 1, characterised in that the effective length (L) of the securing element (6) is greater than the distance (b) between the fastening point (20) of the said securing element (6) and the upper side of the flange (1).

3. Device according to claim 1 or 2, characterised in that the effective length (L) of the securing element (6) is reducible.

4. Device according to claim 1, characterisesd in that the securing element (6) is selectively constituted by a strap, a cable, a chain or a telescopic bar.

5. Device according to claim 1, characterised in that the securing element (6) has a snap hook (6b) at its end which faces away from the bracket (4).

6. Device according to claim 1, characterised in that the support tube (3) is selectively connected, at its first or second end, to the flange (1) or the bracket (4) by a plug-in connection (16), and is secured by a locking element (17).

7. Device according to claim 6, characterised in that the support tube (3) is selectively connected in a sleeve-like manner, at its first or second end, to a tubular connecting piece (1a of 4f as the case may be) which projects either downwards from the flange (1) or upwards from the bracket (4) and is secured, in each case, by a locking pin or a screw (18) which reaches through the support tube (3) and the tubular connecting piece (8, 9) within transverse holes.

8. Device according to claim 1, characterised in that the bracket (4) has a central vertical hole and the securing element (6) extends into the said hole and is fastened therein to said bracket (4).

9. Device according to claim 8, characterised in that the hole is constituted by a tube (4b).

10. Device according to claim 8 or 9, characterised in that a transverse pin (21), to which the securing element (6) is connected, is disposed in the hole.

* * * * *